US008849242B2

(12) United States Patent
Gidron et al.

(10) Patent No.: US 8,849,242 B2
(45) Date of Patent: Sep. 30, 2014

(54) SYSTEM AND METHOD FOR CHARGING FOR DIRECTED PROVISIONING OF USER APPLICATIONS ON LIMITED-RESOURCE DEVICES

(75) Inventors: Yoad Gidron, Yokneam Illit (IL); Ophir Holder, Haifa (IL); Haim Teichholtz, Bitan Aharon (IL)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 10/240,409

(22) PCT Filed: Feb. 21, 2002

(86) PCT No.: PCT/IL02/00139
§ 371 (c)(1),
(2), (4) Date: Oct. 1, 2002

(87) PCT Pub. No.: WO02/071287
PCT Pub. Date: Sep. 12, 2002

(65) Prior Publication Data
US 2003/0060188 A1 Mar. 27, 2003

Related U.S. Application Data

(63) Continuation-in-part of application No. 09/987,514, filed on Nov. 15, 2001.

(60) Provisional application No. 60/270,638, filed on Feb. 23, 2001, provisional application No. 60/280,849, filed on Apr. 3, 2001.

(51) Int. Cl.
*H04M 11/00* (2006.01)
*G06Q 30/04* (2012.01)
*H04L 29/08* (2006.01)

(52) U.S. Cl.
CPC ............... *H04L 67/34* (2013.01); *G06Q 30/04* (2013.01); *H04L 67/04* (2013.01); *H04L 67/30* (2013.01); *H04L 67/02* (2013.01); *H04L 69/329* (2013.01)

USPC ................... 455/406; 455/414.1; 379/127.05; 705/14.27

(58) Field of Classification Search
USPC ........ 455/414.1, 456.1, 456.4, 403, 405–409; 705/400, 14, 26, 29, 37–40, 68, 69, 705/14.27; 707/203; 370/401; 709/229; 379/114.02, 114.03, 114.1, 379/114.16–114.26, 114.28, 115.01, 379/115.02, 121.02–121.03, 127.03–127.05
See application file for complete search history.

(56) References Cited

U.S. PATENT DOCUMENTS

| | | | |
|---|---|---|---|
| 5,430,719 A | 7/1995 | Weisser, Jr. | |
| 5,815,665 A * | 9/1998 | Teper et al. ................... 709/229 |

(Continued)

FOREIGN PATENT DOCUMENTS

| | | |
|---|---|---|
| WO | WO 02/067528 | 8/2002 |
| WO | WO 02/071287 | 9/2002 |

OTHER PUBLICATIONS

N. Alonistioti et al., "An Application Platform for Downloadable VASs Provision to Mobile Users," Oct. 2000, Galway, Ireland.

(Continued)

*Primary Examiner* — MD S Elahee
(74) *Attorney, Agent, or Firm* — Wall & Tong, LLP

(57) ABSTRACT

A system and a method for charging for directed provisioning and using of dynamic content to limited resource devices, through an integrated platform which handles all aspects of aggregation and management of such dynamic content. The integrated platform features a billing system for performing billing actions. The billing system of the present invention interacts with other components of the integrated platform in order to be able to determine the charge for particular triggering events, such as downloading dynamic content, and/or events which are actually triggered by the application itself. The charge is preferably determined according to one of a plurality of rules, as applied by a rules engine of the billing system. These rules are part of a charging policy, which may optionally be determined by the content provider.

28 Claims, 4 Drawing Sheets

(56) References Cited

U.S. PATENT DOCUMENTS

| | | | |
|---|---|---|---|
| 6,226,364 | B1 | 5/2001 | O'Neil |
| 6,393,412 | B1 * | 5/2002 | Deep .......................... 705/400 |
| 6,452,930 | B1 | 9/2002 | Seidman |
| 6,496,979 | B1 | 12/2002 | Chen et al. |
| 6,553,178 | B2 * | 4/2003 | Abecassis .................... 386/83 |
| 6,591,095 | B1 | 7/2003 | Palaniswamy et al. |
| 6,615,034 | B1 * | 9/2003 | Alloune et al. ............. 455/406 |
| 6,647,257 | B2 * | 11/2003 | Owensby .................. 455/414.1 |
| 6,658,000 | B1 * | 12/2003 | Raciborski et al. .......... 370/386 |
| 6,701,521 | B1 | 3/2004 | McLlroy et al. |
| 6,757,530 | B2 | 6/2004 | Rouse et al. |
| 6,773,344 | B1 * | 8/2004 | Gabai et al. .................... 463/1 |
| 6,832,230 | B1 * | 12/2004 | Zilliacus et al. ............. 707/203 |
| 6,832,341 | B1 | 12/2004 | Vijayan |
| 6,907,239 | B1 * | 6/2005 | Sivula ........................ 455/406 |
| 7,092,398 | B2 * | 8/2006 | Schweitzer ................. 370/401 |
| 7,225,238 | B1 | 5/2007 | Dantu et al. |
| 7,373,428 | B1 | 5/2008 | Armstrong et al. |
| 2001/0019960 | A1 | 9/2001 | Takayama et al. |
| 2002/0046299 | A1 | 4/2002 | Lefeber et al. |
| 2002/0061743 | A1 | 5/2002 | Hutcheson et al. |
| 2002/0065067 | A1 | 5/2002 | Khare et al. |
| 2002/0069244 | A1 | 6/2002 | Blair et al. |
| 2002/0083017 | A1 | 6/2002 | Kanniainen |
| 2002/0112171 | A1 | 8/2002 | Ginter et al. |
| 2002/0142760 | A1 | 10/2002 | Gidron et al. |
| 2003/0009385 | A1 | 1/2003 | Tucciarone et al. |
| 2003/0055995 | A1 | 3/2003 | Ala-Honkola |
| 2003/0060188 | A1 | 3/2003 | Gidron et al. |
| 2003/0101135 | A1 | 5/2003 | Myatt et al. |
| 2003/0110044 | A1 | 6/2003 | Nix et al. |
| 2004/0014459 | A1 | 1/2004 | Shanahan |
| 2004/0058673 | A1 | 3/2004 | Irlam et al. |
| 2008/0147506 | A1 * | 6/2008 | Ling .............................. 705/14 |

OTHER PUBLICATIONS

N. Houssos et al., "A VHE Architecture for Advanced Value-Added Service Provision in $3^{rd}$ Generation Mobile Communication Networks," Dec. 2000, pp. 69-78, XP010551465, San Francisco, USA.

* cited by examiner

SYSTEM AND METHOD FOR CHARGING FOR DIRECTED PROVISIONING OF USER APPLICATIONS ON LIMITED-RESOURCE DEVICES

CROSS-REFERENCE TO RELATED APPLICATIONS

This application is a 371 of International Application No. PCT/IL02/00139, filed Feb. 21, 2002, which claims the benefit of U.S. Provisional Application No. 60/270,638, filed Feb. 23, 2001, and claims the benefit of U.S. Provisional Application No. 60/280,849, filed Apr. 3, 2001, and is a CIP of U.S. patent application Ser. No. 09/987,514, filed Nov. 15, 2001, which application claims the benefit of U.S. Provisional Application No. 60/270,638, filed Feb. 23, 2001.

FIELD OF THE INVENTION

The present invention relates to a system and a method for charging for directed provisioning and usage of user applications on limited-resource devices, and in particular, to such a system and method in which billing for such applications is flexibly performed according to a plurality of rules. Examples of suitable devices include, but are not limited to, cellular telephones and handheld computers. These devices are "limited-resource devices" in that computational resources such as memory, storage space and/or data processing capabilities are limited, particularly in comparison to other computational devices such as PCs (personal computers), for example.

BACKGROUND OF THE INVENTION

Cellular telephones have recently become increasingly popular for mobile voice communication, as well as for the exchange of text messages and other types of data. For voice communication, cellular telephone systems provide similar services as the fixed, wire-based telephony system, or PSTN (public switched telephony network), except that cellular telephone systems are based upon signal transmission through radio frequency signals rather than wires. Hence, cellular telephones are also termed "wireless telephones", and communication over such telephones is termed "wireless communication".

One advantage of cellular telephones is that they permit mobile communication, such that subscribers are able to communicate while traveling, or otherwise when they are not at a fixed physical location. In addition, cellular telephones permit subscribers to be contacted regardless of the location of the subscribers. These advantages of mobile communication are also useful for the exchange of data, such as for text messages and even Web pages, for example. Cellular telephones are able to receive text messages through message exchange protocols such as SMS (short message service), for example, which permit one-to-one communication between cellular telephones through text messages. In addition, protocols such as the WAP (wireless application protocol) protocol enable cellular telephones, which are suitably enabled to receive Web pages and receive email. Thus, cellular telephones potentially provide a full communication solution for all of the different types of electronic communication for a subscriber.

However, cellular telephones have a number of disadvantages over other types of computational devices which are used to exchange data, such as desktop computers, for example. Cellular telephones have limited resources, and as such can be considered to be limited resource devices. They are limited by at least one of available memory, storage space, size of the display screen, and/or computational power, as represented by the ability to perform various data processing tasks. These limitations are imposed by the requirements of portability, convenient and simple operation, battery lifetime, weight and size. In addition, the type of limitations and the hardware specifications of each cellular telephone, or other related handheld device, also differ between, cellular telephone service providers and even manufacturers. Thus, designing a single type of application which is suitable for all cellular telephones, for example, is clearly very difficult.

In addition, the heterogeneity of this computational environment extends to the types of communication protocols according to which these different cellular telephones communicate for data transmission. As described above, two of these protocols include SMS, for character-based messages only, and WAP, for more rich data transmissions which may also include graphics. Other protocols include "I-mode", the packet-based cellular telephone data transmission protocol of the Japanese company, NTT DoCoMo (Japan).

Unlike the static content which is delivered through WAP or I-mode, the Java 2 Micro Edition (J2ME) API provides a platform for the development and implementation of dynamic content on limited-resource mobile devices. J2ME is a special version of the popular Java programming language (originally developed by Sun Microsystems), which was adapted to the limitations of consumer and embedded devices with limited resources. It is being defined as an industry standard by companies which manufacture limited resource devices, such as Motorola, Nokia and Palm. A similar but non-compatible Java API has been developed by NTT DoCoMo (Japan) for use on its own wireless network.

Another emerging standard is the Mobile Station Application Execution Environment (MExE), which is defined by the Third Generation Partnership Project (3GPP). MExE provides a standardized execution environment in a mobile station, as well as the ability of the mobile station to negotiate supported capabilities with a MExE service provider, thereby allowing applications to be developed across different platforms. Thus, the capabilities of different cellular telephones and other limited resource devices can be accommodated by a particular application.

This last attempted solution, MExE, is the closest attempt to the provision of an integrated platform for delivering applications to a wide variety of cellular telephones and other limited resource devices. However, MExE still suffers from the drawbacks of lacking a specification or support for a server architecture or specific management functions, both of which are required in order to actually deliver the applications to different limited resource devices. Furthermore, all of the above solutions focus on either a method for creating a user application for operation by a limited resource device, such as the modified version of Java; or a method for delivering and displaying content on the limited resource device, such as WAP. They do not provide an integrated solution for creating the user application; adapting the application according to the different requirements of different limited resource devices; and delivering the application to the device through a client-server system which is compatible with such devices, particularly for wireless communication. In addition, these systems do not provide a solution to the problem of charging the subscriber for receiving and using such content through the limited resource device.

Therefore, there is an unmet need for, and it would be highly useful to have, a system and a method for charging users of limited resource devices for receiving and using user applications at the limited resource devices, which would also enable such billing to be performed according to a plurality of rules through a rules engine.

SUMMARY OF THE INVENTION

The present invention is of a system and a method for charging for directed provisioning and usage of dynamic content on limited resource wireless communication devices, through an integrated platform which handles all aspects of aggregation and management of such dynamic content. The integrated platform features a charging mechanism for performing billing actions. The charging mechanism of the present invention interacts with other components of the integrated platform in order to be able to determine the charge for particular triggering events, such as downloading a unit of dynamic content, and/or events which are actually triggered by the dynamic content itself. The charge is preferably determined according to one of a plurality of rules, as applied by a rules engine of the billing system. These rules are part of a charging policy, which is typically determined by the service provider and parameterized by the content provider. In addition, content providers can submit their own dynamic content-specific charging policies. Hereinafter, the term "limited-resource device" refers to a computational device in which computational resources such as memory, storage space, network bandwidth and/or data processing capabilities are limited, particularly in comparison to desktop computers such as PCs (personal computers), for example.

According to the present invention, there is provided a method for charging for provisioning and usage of a dynamic content on a limited resource device through an integrated platform, the steps of the method comprising: (a) sending an event regarding the dynamic content to the integrated platform; (b) analyzing the request to determine an amount to be charged by the integrated platform; and (c) charging the user the amount for consuming the dynamic content.

According to another embodiment of the present invention, there is provided a system for charging for consuming a unit of dynamic content, the system comprising: (a) a limited resource device for receiving the dynamic content; and (b) a billing system for determining an amount to be charged for the dynamic content, wherein the billing system comprises a rules engine for selecting at least one rule for determining the condition and the amount to be charged.

According a still further embodiment of the present invention the charging policy as determined may be stored in an appropriate electronic format on the integrated platform to be easily accessible as required. Optionally and preferably there is provided a policy editor module which may be used by the service provider and/or the content provider to create and alter charging policies according to requirements.

Hereinafter, the term "network" refers to a connection between any two or more computational devices which permits the transmission of data.

Hereinafter, the term "computational device" includes, but is not limited to, personal computers (PC) having an operating system such as DOS, Windows™, OS/2™ or Linux; Macintosh™ computers; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers (based on operating systems such as EPOC and Windows CE), PDA (personal digital assistant) devices (e.g. Palm Pilot), cellular telephones, two-way pagers, any type of WAP (wireless application protocol) enabled device, wearable computers of any sort, and any device which can be connected to a network as previously defined and which has an operating system. Hereinafter, the term "Windows™" includes any version of this operating system by Microsoft Corp. (USA).

Hereinafter, the term "cellular communication device" refers to any type of wireless handset or device, including but not limited to cellular telephones or other types of computational device as defined above, which is capable of voice and/or data transfer through a radio frequency signal, optionally through a connection to the PSTN (public switched telephone network).

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functions performed by the method could be described as a plurality of instructions performed by a data processor.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and a method for charging for directed provisioning and usage of dynamic content, such as user applications for example, to limited resource devices, through an integrated platform which handles all aspects of aggregation and management of such dynamic content. The integrated platform features a charging mechanism for performing billing actions. The charging mechanism of the present invention interacts with other components of the integrated platform in order to be able to determine the charge for particular triggering events, such as downloading a unit of dynamic content, and/or events which are actually triggered by the dynamic content itself. The charge is preferably determined according to one of a plurality of rules, as applied by a rules engine of the billing system. These rules are part of a charging policy, which is optionally and preferably determined by the service provider, and parameterized (setting one or more parameters) by the content provider. In addition, content providers can submit their own dynamic content-specific charging policies.

Optionally and preferably the overall charging policy is embodied in the form of a "dynamic content level billing model". A dynamic content-level billing model provides the means for implementing different business models for different applications. That is, each unit of dynamic content may have its own billing model, as specified by its provider. This flexibility is achieved by collecting information about the activities of the system and applications and applying dynamic billing models. A billing model is preferably defined as a plurality of rules, the application of which is optionally and preferably triggered by runtime events.

As used herein, the term "dynamic content" refers to a unit of content and/or to a set of instructions for execution by the limited resource (user) device, possibly interacting with a server side application across the network. The content may optionally include any type of media, including but not limited to, any one of audio data, video data, graphic images and text, any type of application which includes any type of media (such as any one or more of audio data, video data, graphic images and text) or a combination thereof. Preferably, the dynamic content includes such a set of instructions for execution by the device, which optionally and more preferably are written in a interpreted language such as Java, for example. However, the dynamic content optionally and most preferably also features one or more components of a user interface, for example in order to select a particular set of instructions and/or type of content.

The principles and operation of the present invention may be better understood with reference to the drawings and the accompanying description.

Figure 1:
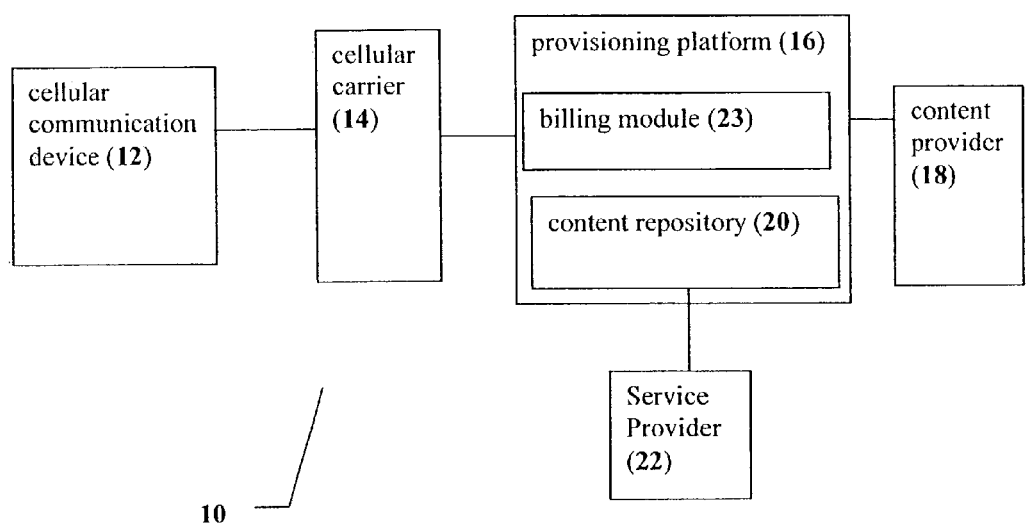
FIG. 1. is a schematic block diagram of an exemplary system according to the present invention.

Referring now to the drawings, FIG. 1 is a schematic block diagram of a system according to the present invention for dynamic content creation for, and delivery to, limited resource devices, including a mechanism for billing the user for consuming the content at the limited resource device. The present invention is described with regard to cellular communication devices as the limited resource devices, it being understood that this is for the purposes of illustration only and is not intended to be limiting in any way.

As shown, a system 10 features a cellular communication device 12, operated by a user (not shown), who subscribes to a cellular carrier 14. Cellular carrier 14 typically provides a number of different services through cellular communication device 12, including, but not limited to, voice communication and/or data transmission. Cellular carrier 14 may also include other types of functions, provided through a variety of different hardware and/or software components, as is well known in the art.

For the purposes of the present invention, cellular carrier 14 is also in communication with a provisioning platform 16 according to the present invention. As described in greater detail below, provisioning platform 16 features a number of different components, for the creation of dynamic content which is adaptable to a variety of devices such as cellular communication device 12; for the delivery of such dynamic content to cellular communication device 12, and optionally other devices, preferably only as required or "on-demand"; and for optionally receiving such dynamic content from third party providers.

With regard to the last feature, provisioning platform 16 is preferably in communication with a content provider 18. Content provider 18 preferably actually submits each such dynamic content to a content repository 20 of provisioning platform 16, which is managed by a Service Provider 22. Each unit of dynamic content, more preferably with any required and/or preferred modifications or specific implementations, may then be transmitted to cellular communication device 12 and/or another limited resource device (not shown). Optionally and most preferably, the user subscribes to any particular dynamic content through cellular carrier 14, in order to receive such dynamic content through cellular communication device 12.

According to preferred embodiments of the present invention, the procedure for providing such a dynamic content through system 10 is preferably performed as follows. First, the dynamic content itself is preferably developed, for example by a third party such as content provider 18. More preferably, the dynamic content is created through an API (application programming interface) and set of tools according to the present invention, as described in greater detail below.

Next, content provider 18 preferably submits a new unit of dynamic content to Service Provider 22, which manages such dynamic content. This procedure for submitting a new unit of dynamic content is preferably performed according to a standardized submission protocol. Next, Service Provider 22 preferably uses a set of tools according to the present invention in order to inspect and certify the submitted units of dynamic content. Optionally and most preferably, the dynamic content is also submitted with any other information which may be required by another component of system 10, such as a pricing scheme and/or delivery information, for example.

If the dynamic content is found to be suitable, Service Provider 22 then preferably approves and publishes the new dynamic content. Publication enables the new dynamic content to be available to user devices such as cellular communication device 12 for example. Publication is preferably performed by placing the dynamic content in content repository 20, for delivery to cellular communication device 12. Content repository 20 then optionally and more preferably organizes the dynamic content into a dynamic content directory, which contains information about the available units of dynamic content. Optionally, the distribution of the dynamic content may also include features for supporting financial remuneration, for example through subscriptions, as described in greater detail below.

With such a directory, units of dynamic content are optionally and preferably organized into a hierarchical tree of categories and sub-categories, and are also more preferably associated with attributes. Also optionally, different service packages may also be associated with different categories and/or sub-categories. Different filters and/or tools according to the present invention are optionally and preferably provided in order to customize the dynamic content according to the requirements and/or requests of the users, and also to manage the directories themselves.

Optionally and preferably, the user must be eligible to receive a particular unit of dynamic content in order to receive such a dynamic content through cellular communication device 12. For example, the user could optionally have some type of subscription, to a particular unit of dynamic content but more preferably to a category or type of dynamic content, or even to any such dynamic content available through cellular carrier 14, as well as variations thereof. Subscription is optionally and preferably performed through cellular carrier 14.

Billing for these subscriptions is then optionally and preferably performed through a billing module 23, which is optionally and more preferably located at provisioning platform 16. Billing module 23 determines a charge for consuming certain types of dynamic content by cellular communication device 12, optionally and more preferably according to a plurality of rules, as described in greater detail with regard to FIGS. 3 and 4 below. In addition, subscriptions are preferably supported by a repository of subscriber information, which is part of provisioning platform 16. The repository of subscriber information contains information about different users, and more preferably also contains information about their respective user devices such as cellular communication device 12, and any user preferences. However, for those systems which are based on protocols such as GSM, such information about the respective user devices may not be available. System 10 is therefore preferably capable of operating without such information.

Figure 2:
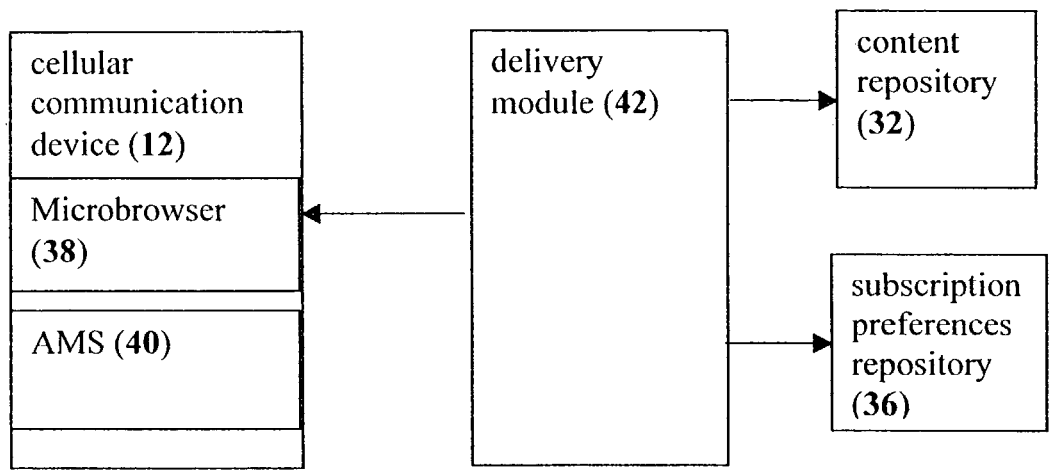
FIG. 2 is a schematic block diagram of an exemplary delivery system according to the present invention.

Delivery of the dynamic content is preferably performed as described with regard to the system of FIG. 2. FIG. 2 shows a schematic block diagram of an exemplary system according to the present invention for content delivery, with additional details concerning a preferred implementation for such delivery according to the present invention.

As shown, cellular communication device 12 preferably features a discovery application such as a Microbrowser 38 for discovering various types of content, and an AMS (Application Management Software) module 40 for downloading, installing and launching applications, and/or for handling any type of content, whether applications or other types of content, which as previously described, may be collectively termed "dynamic content". It should be noted that although the system of FIG. 2 is described with regard to Java as the application execution language, this is for the purposes of description only and is without any intention of being limiting in any way. The present invention could also, additionally or alternatively, be operative with other types of execution languages, as could easily be determined by one of ordinary skill in the art, such that these other types of execution languages are also considered to be within the scope of the present invention.

System 10 preferably contains a delivery module 42 for actually delivering each dynamic content to cellular communication device 12.

If AMS module 40 determines that the corresponding dynamic content should be downloaded by cellular communication device 12, then preferably AMS module 40 sends a request for the dynamic content itself to delivery module 42. An adapted dynamic content is then preferably dynamically generated and sent by delivery module 42 to cellular communication device 12. Adaptation according to the requirements of cellular communication device 12 is preferably performed through one of the following methods.

For example, the content provider (not shown) could optionally manually prepare different variations of the dynamic content, based on specific device features such as screen size, proprietary API's and so forth. The supporting publication tools and directory structure are preferably also determined in order to support different versions of the same dynamic content. The correct variation of the dynamic content is then preferably selected according to the type of user device which sent the request, for example, according to the type of cellular communication device 12. Delivery module 42 optionally and preferably obtains information about the subscriber and/or particular user device from a subscription preferences repository 36. The actual content is optionally and preferably obtained from a content repository 32.

Figure 3:
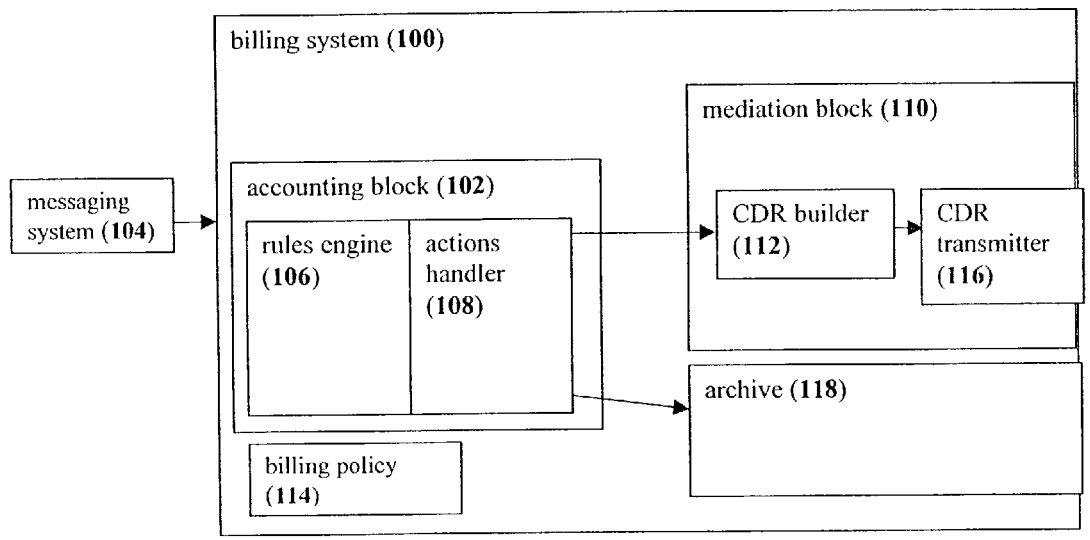
FIG. 3 is a schematic block diagram of an exemplary billing system according to the present invention.

FIG. 3 is a schematic block diagram of an exemplary billing system according to the present invention, which is a preferred embodiment of the billing module of FIG. 1. A billing system 100 features an accounting block 102. Accounting block 102 performs any calculations which are required for billing events, or events within the overall system of the present invention which actually trigger billing. These events are preferably received through a messaging system 104, which communicates with the remaining modules of the provisioning platform of FIG. 1. Each of these components may optionally publish events through messaging system 104. Accounting block 102 preferably receives these events through rules engine 106, which optionally and more preferably acts as a subscriber in messaging system 104.

Accounting block 102 preferably contains an actions handler 108, in addition to rules engine 106. Rules engine 106 preferably analyzes incoming events which may trigger billing, such as a request for particular content from a particular user through a limited resource device. Rules engine 106 then determines which rule(s), of a plurality of such rules that are specified in billing policy 114, should apply to the incoming event, calculates the conditions that are associated with these rules and operates the relevant actions. Actions handler 108 is responsible for actually executing the action from rules engine 106, both by interacting with other modules of billing system 100 and by interacting with other modules of the provisioning platform.

Preferably, the rules used by rules engine 106 are part of billing policy 114 which is determined by the service provider and parameterized by the content provider. For example, the policy may optionally define the actual prices for dynamic content, the events which may trigger the charging operation, the conditions under which the event occurred and the actions which must be executed as a result. Each charging rule in the policy is preferably composed of a triplet of events, conditions and actions (ECA). A simple example for a charging rule would be "every download of the application 'Chess' will cost $1". Here, the trigger for applying the rule is a download of an application named "Chess", which is a download event, and the outcome is an action for charging the price of $1.

Examples of different types of events include but are not limited to, application-specific events which according to the preferred embodiments of the present invention are defined as events that are preferably generated by applications executed on the device, such as a game being played for example; or as events that are optionally and preferably generated in any computational device communicating with the device over a network as a consequence of the execution of an application, such as a stock trading server, for example, execution which causes a stock transaction to be executed. These events may also be system events which according to the preferred embodiments of the present invention are defined as events other than application specific events, that are preferably and optionally generated by one or more components of the system. These events may optionally include but are not limited to, events optionally and preferably generated by the infrastructure such as an application download for example; or events that are preferably and optionally sent from the client, which may for example be generated by the application on the device, or alternatively generated by the dynamic content manager on the device. Each event is optionally and preferably associated with one or more parameters, for example, subscriber ID (identifier) and application ID. These parameters can optionally and more preferably be used in order to retrieve additional information about the context of the event.

A specific condition may optionally be added to each rule in the policy, which is based upon some predefined parameters so that the price of a specific event is flexible and may have multiple options given different conditions. For example, different prices may be charged at different times of the day. The condition is more preferably expressed as a logical expression which yields a true/false value. Examples of parameters for the condition include, but are not limited to, subscriber information, such as name, age, gender and other types of demographic information; application data, such as the name of the dynamic content, size of the dynamic content, flavor, or type of limited resource device, and so forth; delivery conditions, such as delivery time, size, and so forth; and dynamic content-specific information. The subscriber and dynamic content data may optionally be retrieved from specific repositories, as described with regard to FIG. 2 above.

When a rule is activated and its condition is met, the action is performed as defined in the rule. Optionally and most preferably the action is Charge which according to preferred embodiments of the present invention is defined as a request for the subscriber to pay a fee for use of the user application. In the case of Charge the subscriber, or user, of the limited resource device is optionally and more preferably charged according to one of the following price specifications: a general price for the dynamic content, as set in the submission process; a price that is specified according to policy parameters; a price that is specified by the event which is sent by the application or a price that is determined by billing system 100. However, other actions can also be used, such as Send Notification or Set Value.

One example of such a charging policy is a rule that states "downloading a particular game costs 10 cents for a version for the Palm Pilot™ and 5 cents for a version for a cellular communication device". The event is an application download, in which the application is a game. The condition determines the price of the game, while the action is charging that price for the game. More formally, if the application version or flavor="palm", then do charge ten cents. Alternatively, if the application version or flavor="phone", then do charge five cents.

According to preferred embodiments of the present invention, application-specific charging is performed as follows. Each billing event of this type is triggered by the application itself and is determined in advance by the content provider, as previously described. For example, if the content provider has developed a new game, then optionally the user could be charged each time another stage in the game is completed. The charging policy, or rule(s), would then be based upon events occurring within the application.

These custom application events are preferably created through an events API (application programming interface), which enables the application developer to publish events that are handled by accounting block 102. More preferably, these application events can be triggered both by backend applications, or applications which exist at the content provider, and device applications, or applications which are operated or otherwise accessed by the limited resource device itself. Rules engine 106 preferably receives these events from the application, loads the appropriate charging policy rule base (preferably as determined by the content provider) and triggers the execution of the appropriate charging rules.

Optionally and most preferably, a policy editor (not shown) is used to define flexible charging policies by the developer and/or content provider, based on application custom events. The application developer and/or content provider can optionally and more preferably define the structure of the custom events, define charging rules based on these events, and create a charging policy rule base. The policy file is optionally and preferably stored for easy access as required, in which case the policy would be referred to as "Server-side policy". This file is optionally and preferably accessed by the content management mechanism, and optionally and more preferably executed by rules engine 106 when the application event is received.

Optionally and preferably, a client side policy is defined as a set of compiled rules that are optionally and preferably attached to an application before it is being delivered to a client device. This policy preferably enforces the license agreement by which the application was provided. For example, the application could optionally be provided under a license for a limited period of usage or a limited number of uses. It optionally and preferably completes or otherwise complements the server side policy, by allowing some of the actions to be performed offline. Client-side policy optionally and preferably enables applications to be executed without requiring an event to be sent to the server. Optionally but not exclusively, client side policies can be used in order to limit the number of times an application is allowed to run, to limit the period in which an application is valid or to allowing the license to be renewed online.

Optionally and preferably client side policies are implemented through additional software components known as "wrappers" that are optionally and preferably generated automatically by the system with or without the involvement of the developer. The wrapper optionally and preferably controls the execution of the application by checking the license terms each time the application is started. If the license is valid, the application is invoked, otherwise, the user is notified and offered to renew the license. Without renewing the license, the user is not able to run the application.

Optionally and preferably the overall policy by which a user is charged for consuming a downloadable unit of dynamic content (i.e. an application that is provisioned to a wireless communication device) is referred to as a "dynamic content level billing model". A dynamic content-level billing model is the preferred method to enable the implementation of different business models for different units of dynamic content. That is, each unit of dynamic content optionally and preferably has an associated billing model, preferably as specified by the provider of that unit of dynamic content. This flexibility is optionally and more preferably achieved by collecting information about the activities of the system and units of dynamic content and applying dynamic billing models.

According to optional and preferred embodiments of the present invention, a billing model is optionally and preferably composed of a server side policy, optionally with a client side policy, and/or download policy which defines the conditions which must pertain before units of dynamic content may be downloaded. Each of these policies is optionally and preferably associated with one or more parameters optionally and preferably provided with the unit of dynamic content.

According to optional but preferred embodiments of the present invention, billing models that may be considered include download-based billing, where the user is charged on downloading the dynamic content; usage-based billing, where the user is charged for the number of times the dynamic content is used, or for the period in which it is used; subscription-based billing, where the user is charged a periodical fee for a limited or unlimited consumption of services and application-specific billing, where the user is charged for performing various actions within the application (the meaning of these actions is may optionally be known only to, but at least is known by, the application). The above examples should be considered typical and illustrative and by no means exhaustive or exclusive.

One example of such a billing model is the "try and buy" model. The client-side policy states that free access will be given a certain number of times according to the client side parameter. After this point, if the user wants to continue to use the application, a renewal is requested from the server. The server, in response, charges a price according to its policy parameter, after which all calls to the wrapper are preferably transferred to the original application. Download policy may optionally be to allow a single download for the purposes of trying the particular dynamic content.

A further example of a billing model is the "One time fee" model. There is no client-side policy and the server side policy determines a single charge priced according to its policy parameter in response to download. Download policy is to allow a download if the user agrees to pay.

A further example of a billing model is the "limited usage" model. The server charges a price according to its policy parameter in response to installation of the dynamic content. The client-side policy states that access is given a certain number of times after installation according to the client side parameter. After this point, a renewal is requested from the server, which in response charges a price according to its policy parameter, after which control once again preferably returns to the client-side policy. Download policy is optionally to allow a download if the user agrees to pay.

A further example of a billing model is the "time-limited usage" model. The server charges a charge a price according to its policy parameter in response to the installation of the application. The client-side policy states that access is given for a certain period of time after installation according to the client side parameter. After this point, if desired by the user, a renewal is requested from the server, which in response charges a price according to its policy parameter. Now control once again preferably returns to the client-side policy. Download policy is to allow a download if the user agrees to pay.

A further example of a billing model is the "pay per usage" model. Each time the application is used and/or otherwise accessed, the client-side policy preferably requests a renewal from the server, which in response charges a price according to its policy parameter. Download policy is to allow a download if the user agrees to pay.

A further example of a billing model is the "periodic subscription" model. The server charges a single price according to its policy parameter, in response to the downloading and installation of the dynamic content for the first time, and allows a certain number of downloads, determined by a policy parameter, until renewal. The client-side policy states that access is optionally and preferably granted freely for a certain period of time after installation, according to the client side parameter. After this point, if desired by the user and optionally and more preferably if the download limit has not been exceeded, a renewal is requested from the server. The server, in response, charges a price according to its policy parameter, after which control once again preferably returns to the client-side policy. Download policy is to allow a download if the maximum number of downloads has not been exceeded.

A further example of a billing model is the "Pay per download" model. There is no client-side policy and the server side policy determines a charge priced according to its policy parameter in response to each download. Download policy is to allow a download if the user agrees to pay.

A further example of a billing model is the "flat subscription" model. The server charges a single price according to its policy parameter and then allows an unlimited number of downloads. The client-side policy states that access is given a freely for a certain period of time after payment, according to the client side parameter. At the end of this period, a renewal is requested from the server which in response charges a price according to its policy parameter. Control once again then preferably returns to the client-side policy. Download policy is to allow the user to download freely.

An example of a particular application-specific billing model could be where an application supplies stock quotes which in general cost 10 cents per stock quote. Between 7:00 pm and 7:00 am, the stock quotes may optionally cost 5 cents. This is preferably implemented as a server-side policy only, with the different prices as its parameters and the provision of the stock quotes as its events. Download policy is to allow a download if the user agrees to pay.

According to optional but preferred embodiments of the present invention, billing system 100 also features a mediation block 110 for receiving charge commands from actions handler 108 of accounting block 102. Mediation block 110 then preferably submits a charge message to the outside billing system in the protocol of that billing system. For example, mediation block 110 could optionally communicate with the billing system of the cellular carrier of FIG. 1, according to the format or language of that particular billing system.

Optionally, mediation block 110 features a CDR builder 112 for receiving the charge command and for producing the CDR (call data record) according to a format which is defined by the carrier (or other outside billing entity). The CDR is then transmitted to the external billing system by a CDR transmitter 116. The data for the CDR may optionally be stored at billing system 100 and/or another module of the system of FIG. 1 or 2 as static data, or alternatively may be dynamic data which depends on the particular charging event, as received from accounting block 102. Examples of static data include, but are not limited to, subscriber identification and profile information; dynamic content attributes, such as name, size and so forth; and content provider information. Examples of dynamic data include, but are not limited to, timing data (concerning the time period at which the triggering event occurred); the type of triggering event, such as download or application-specific events; and the amount to be charged or the rate of charging.

Auxiliary data may also optionally be attached to the CDR for validation purposes by the external billing system. Examples of auxiliary data include, but are not limited to, a unique identifier for the CDR; sequence information, such as a sequential number for each CDR, and so forth; the time of creation for the CDR; and metadata which defines the record type and/or record specific fields.

According to preferred embodiments of the present invention, billing system 100 optionally and preferably also features an archive 118 for storing the data which influenced the execution of particular billing actions, as well as the details of these actions. For example, archive 118 preferably stores information in order to be able to recreate each CDR, as well as those parameters and values which were used by rules engine 106 in order to determine a particular charge for a particular billing event. Archive 118 can optionally be used to generate reports for submission to the dynamic content developers and/or content providers, as well as for generating billing reports for the users, as described in greater detail below. In addition, archive 118 can also optionally be consulted for the history and details of billing actions in cases of suspected fraud.

Figure 4:
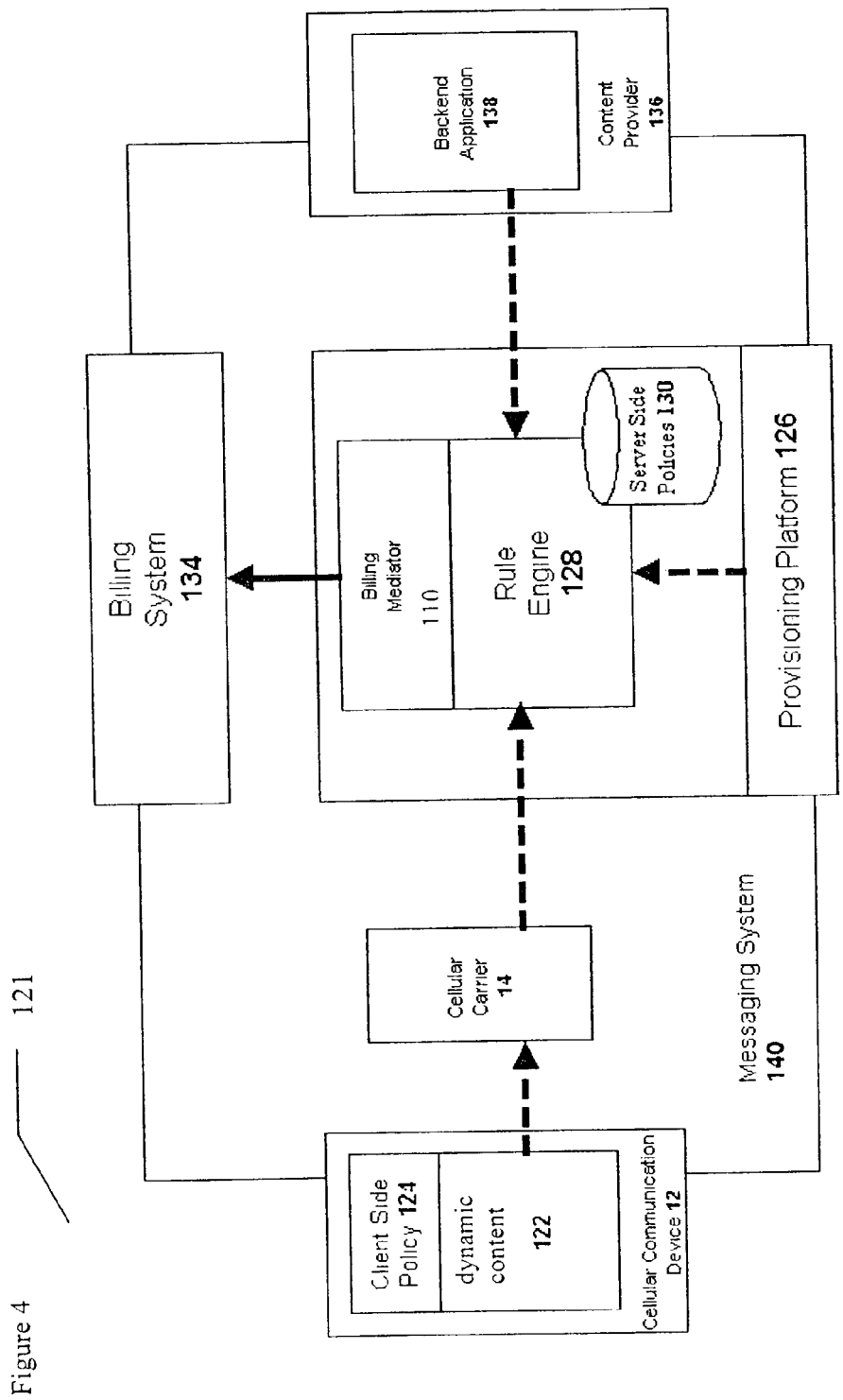
FIG. 4 is a schematic block diagram of an exemplary system according to the present invention.

FIG. 4 shows a schematic block diagram of an exemplary system 121 according to the present invention for the management of billing models with additional details concerning a preferred implementation for such management according to the present invention.

As shown, a system 121 features a cellular communication device 12, operated by a user (not shown), who subscribes to a cellular carrier 14. Cellular carrier 14 typically provides a number of different services through cellular communication device 12, including, but not limited to, voice communication and/or data transmission. Cellular carrier 14 may also include other types of functions, provided through a variety of different hardware and/or software components, as is well known in the art.

For the purposes of the present invention, cellular carrier 14 is also in communication with a provisioning platform 126 according to the present invention. As described in greater detail below, provisioning platform 126 features a number of different components involved in the management of billing models.

According to preferred implementations of the present invention provisioning platform 126 communicates with the various components of system 121 by means of a messaging system 140 which is optionally and preferably responsible for distributing the events that are published by the various sources within system 121. Messaging system 140 may optionally be synchronous or asynchronous. Messaging system 140 should preferably be able to deliver events that are published from cellular communication device 12 over a wireless network more preferably through cellular carrier 14.

As shown, cellular communication device 12 is capable of executing and/or otherwise accessing and/or displaying and/or consuming one or more units of dynamic content 122. A client side policy 124 is optionally and preferably attached to each unit of dynamic content 122 and most preferably is executed and/or otherwise accessed locally by cellular communication device 12.

Provisioning platform 126 is preferably able to serve one or more units of dynamic content to cellular communication device 12, shown as a unit of dynamic content 122 for the purposes of explanation only and without any intention of being limiting. A plurality of such units of dynamic content 122 may optionally be present on, and operated by, cellular communication device 12.

Provisioning platform 126 preferably contains a rule engine 128 which receives events and applies one or both of charging policies 124, 130. While operating, rule engine 128 optionally and preferably accesses various repositories in system 121 (not shown), in order to retrieve various items of data, including, but not limited to, data about subscribers (not shown), data about dynamic content 122, data about or from backend application 138 and data about or from one or more content providers 136.

Amongst the repositories accessed by the rules engine is a server side policy repository also preferably located on provisioning platform 126 which more preferably includes server-side charging policies 130 that are more preferably specified by a service provider (not shown) and optionally and more preferably by one or more content providers 136.

Upon receiving one or more events, rule engine 128 preferably identifies dynamic content 122 and optionally and preferably selects relevant rules. Each rule is preferably activated, by evaluating appropriate conditions and more preferably executing an action if a condition is met. An optional and still more preferable result of an action is generation of a billing record by billing mediator 110 which then most preferably transmits billing records to external billing system 134 in a configured protocol, as defined by external billing system 134.

Provisioning platform 126 is also optionally and preferably in communication with one or more content providers 136. Although a plurality of such content providers 136 may optionally be in communication with provisioning platform 126, only one such content provider 136 is shown for the purposes of illustration only and without any intention of being limiting. One or more content providers 136 may optionally run backend (i.e. server component) application 138.

According to optional and more preferred embodiments of the present invention the process of defining and applying billing models involves the content provider 136, service provider (not shown), which may optionally be for example the owner of provisioning platform 126, and subscriber (also not shown). Optionally and more preferably, a service provider predefines billing models that are optionally and preferably used by content providers 136. These billing models can most preferably be easily customized by specifying optional parameters optionally and preferably for server-side policy 130 (typically but not exclusively price) or optionally and preferably client-side policy 124 (typically but not exclusively number of allowed uses). Optionally and more preferably, a service provider is responsible for reviewing and approving billing models that are submitted by content providers 136.

More preferably, when dynamic content 122 is submitted, content provider 136 preferably selects an applicable billing model and optionally and more preferably provides parameters. Content provider 136 optionally and still more preferably defines new billing models by more preferably and optionally composing new policies for one or both of client side policy 124 and backend application 138. Optionally and most preferably, policies are submitted through files that are generated by a policy editor (not shown). For application-specific billing models, this is the most preferred way in which content provider 136 can associate rules with events that are generated from within application 122.

A subscriber (end user) can optionally select from multiple billing models before downloading dynamic content 122. Alternatively, the end user may optionally be allowed only to select a particular dynamic content 122, but not the billing model, which is then selected by system 121. In any case, system 121 preferably performs a series of actions in order to follow a particular billing model. Optionally and most preferably at least one component of system 121, such as provisioning platform 126 for example, generates an event that indicates the delivery mechanism and a preferred billing model.

More preferably, system 121 determines whether a user is allowed to download dynamic content 122, according to download policy (not shown). Optionally and still more preferably system 121 attaches client side policy 124 to application 122, most preferably with one or more relevant parameters, such that client side policy 124 is sent to cellular communication device 12, most preferably with application 122.

According to preferred implementations of the present invention, a billing model is preferably processed by system 121 in several stages. During the provisioning and execution of dynamic content 122 one or more events are optionally and preferably generated.

A "dynamic content delivery/installation" event is optionally and preferably generated by provisioning server 126 when dynamic content 122 is preferably delivered to cellular communication device 12 or optionally and more preferably installed on cellular communication device 12 (optionally and preferably reported by cellular communication device 12 itself). This event, and those events which are described in greater detail below, may be generalized to any type of dynamic content but are described herein with regard to applications for the purpose of discussion only, and without any intention of being limiting.

An "application start" event is optionally and preferably generated by application 122 on cellular communication device 12 (in this example, as an application) and optionally and more preferably handled locally by client side policy 124.

Periodic events are optionally and preferably generated by system 121 at specific defined time intervals (typically but not exclusively once a day, week, month, etc.) and are optionally and preferably are used for triggering subscription charging.Examples of such subscription charging are described above.

License renewal events are optionally and preferably generated by provisioning server 126 to indicate that a user has renewed a license for an dynamic content 122. Application-specific events are optionally and preferably generated by application 122 or optionally and preferably by backend application 138 on the occurrence of various activities, preferably with regard to actions on, by or with dynamic content 122.

Events are optionally and more preferably reported to system 121 through a messaging protocol supported by messaging system 140. For server-side events, event reporting is optionally and preferably done through an internal messaging mechanism.

While the invention has been described with respect to a limited number of embodiments, it will be appreciated that many variations, modifications and other applications of the invention may be made.

What is claimed is:

1. A method for charging for consuming dynamic content at a limited resource device, the steps of the method comprising:
    receiving at a billing system an event indicative of consumption of a content unit by a device of a user, wherein an authorization of said user to consume said content unit is defined via license terms within a client side policy; and
    analyzing said event to determine an amount to be charged by the billing system, wherein a cost to said user to consume said content unit is defined via content unit associated billing terms within a server side charging policy of the service provider, said event being analyzed according to at least one of a plurality of rules defined in accordance with said server side charging policy, said content unit associated billing terms including content provider defined parameters within said at least one of said plurality of rules wherein each of said plurality of rules is associated with at least one event type, at least one condition under which an action is triggered, and at least one action to be taken in response to the triggering of the rule.

2. The method of claim 1, wherein the limited resource device is a wireless communication device.

3. The method of claim 2, wherein the limited resource device is a cellular communication device.

4. The method of claim 1, wherein step (b) includes the steps of: (i) analyzing said event to select said at least one rule of a plurality of rules for determining said amount to be charged; and (ii) applying said selected at least one rule to determine said amount to be charged.

5. The method of claim 1, wherein said event is a request to receive the dynamic content for downloading to the limited resource device.

6. The method of claim 1, wherein for at least one of said plurality of rules, the event type comprises a dynamic content consumption event, the triggering condition comprises receiving a dynamic content request from a user device, and the action comprises charging the user for the dynamic content.

7. The method of claim 1, wherein said condition under which an action is triggered comprises one or more of subscriber information regarding a user of the limited resource device, delivery conditions for delivering requested content and information specific to the requested content.

8. The method of claim 1, wherein information about a content request and an amount to be charged is stored.

9. The method of claim 1, wherein said event is triggered by an application executed on the user device.

10. The method of claim 1, wherein said event is triggered by a computational device in communication with the user device.

11. The method of claim 1, wherein for at least one of said plurality of rules, the event type comprises a download event, the triggering condition comprises receiving a download request from a user device, and the action comprises charging the user for the content.

12. The method of claim 1, further comprising receiving, via a policy editor module, updates to content unit associated billing terms included within one or more of said plurality of rules.

13. The method of claim 12, wherein said content unit associated billing term updates are provided by any of said service provider and the corresponding content provider.

14. The method of claim 1, wherein said content provider defined parameters within said at least one of said plurality of rules are dynamically updatable by respective content providers.

15. A system for charging for consuming dynamic content at a limited resource device, the system comprising:
    a billing infrastructure for charging for the dynamic content according to at least one event indicative of consumption of a content unit by a limited resource device of a user, wherein an authorization of said user to consume said content unit is defined via license terms within a client side policy;
    the billing infrastructure comprising a rule engine operatively coupled to a messaging system of a communication service provider for receiving therefrom said at least one event, the rule engine analyzing each received event to determine an amount to be charged, wherein a cost to said user to consume said content unit is defined via content unit associated billing terms within at least one of a plurality of rules defined in accordance with a server side charging policy retrieved by said rule engine from a data repository, said content unit associated billing terms including content provider defined parameters within said at least one of said plurality of rules wherein a download policy retrieved by said role engine defines conditions for permitting the downloading of the dynamic content; and said server-side charging policy defines at least one rule of a plurality of rules wherein each of said plurality of rules is associated with at least one event type, at least one condition under which an action is triggered, and at least one action to be taken, in response to the triggering of the rule.

16. The system of claim 15 wherein said event is generated by a component of the system in communication with said limited resource device.

17. The system of claim 16 wherein said event is generated during execution of a user application at said limited resource device.

18. The system of claim 17 wherein said condition is determined according to at least one parameter selected from the group consisting of data attached to said event, global data, and predefined parameters.

19. The system of claim 18 wherein said action is a charging action, and wherein a price to be charged is determined according to at least one parameter selected from the group consisting of data attached to said event, global data, and predefined parameters.

20. The system of claim 19 further comprising: an external billing system which receives said charging action from said rules engine.

21. The system of claim 20 wherein said rule engine further comprises: a billing mediator for transferring said charging action from said rules engine to said external billing system.

22. The system of claim 15 wherein said client side policy is included within a wrapper downloaded with each application to a user device and wherein said client side policy further executes from said device in response to said event.

23. The system of claim 22 wherein said client side policy comprises a software wrapper for the user application.

24. The system of claim 23 wherein said wrapper is generated automatically by the system.

25. The system of claim 24 wherein the user application is provided with a license and wherein said wrapper checks said to determine validity of said license.

26. The system of claim 25, wherein said analysis of said billing model is performed by said rule engine in response to receipt of said event, and wherein said analysis comprises: identifying the application, selecting said at least one rule, and evaluating said condition.

27. A tangible and non-transient computer readable storage medium storing instructions which, when executed by a computer, adapt the operation of the computer to provide a method for charging for consuming dynamic content at a limited resource device, the method comprising:
receiving at a billing system an event indicative of consumption of a content unit by a device of a user, wherein an authorization of said user to consume said content unit is defined via license terms within a client side policy; and
analyzing said event to determine an amount to be charged by the billing system, wherein a cost to said user to consume said content unit is defined via content unit associated billing terms within a server side charging policy of the service provider, said event being analyzed according to at least one of a plurality of rules defined in accordance with said server side charging policy, said content unit associated billing terms including content provider defined parameters within said at least one of said plurality of rules wherein each of said plurality of rules is associated with at least one event type, at least one condition under which an action is triggered, and at least one action to be taken in response to the triggering of the rule.

28. A computer program product wherein computer instructions, when executed by a processor in a telecom network element, adapt the operation of the telecom network element to provide a method for charging for consuming dynamic content at a limited resource device, the method comprising:
receiving at a billing system an event indicative of consumption of a content twit by a device of a user, wherein an authorization of said user to consume said content unit is defined via license terms within a client side policy; and
analyzing said event to determine an amount to be charged by the billing system, wherein a cost to said user to consume said content unit is defined via content unit associated billing terms within a server side charging policy of the service provider, said event being analyzed according to at least one of a plurality of rules defined in accordance with said server side charging policy, said content unit associated billing terms including content provider defined parameters within said at least one of said plurality of rules wherein each of said plurality of rules is associated with at least one event type, at least one condition under which an action is triggered, and at least one action to be taken in response to the triggering of the rule.

* * * * *